United States Patent
Sanada et al.

(10) Patent No.: US 8,537,429 B2
(45) Date of Patent: Sep. 17, 2013

(54) DOCUMENT SCANNING DEVICE HAVING LIGHT GUIDE THAT ILLUMINATES DOCUMENT AND REFERENCE PLATE

(75) Inventors: Takafumi Sanada, Fukuoka (JP); Yuuzou Kawano, Fukuoka (JP); Kohei Suyama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 498 days.

(21) Appl. No.: 12/903,294

(22) Filed: Oct. 13, 2010

(65) Prior Publication Data
US 2011/0085212 A1 Apr. 14, 2011

(30) Foreign Application Priority Data
Oct. 13, 2009 (JP) .................. 2009-236154

(51) Int. Cl.
*H04N 1/04* (2006.01)
(52) U.S. Cl.
USPC ............................ 358/474; 358/461; 382/274
(58) Field of Classification Search
USPC .............. 358/400, 401, 461, 471, 474, 494; 382/274
See application file for complete search history.

(56) References Cited

U.S. PATENT DOCUMENTS
5,982,948 A * 11/1999 Shimada et al. .............. 382/274

FOREIGN PATENT DOCUMENTS
| JP | 60173971 A | * | 9/1985 |
| JP | 60182857 A | * | 9/1985 |
| JP | 2001-61040 | | 3/2001 |
| JP | 2006-211526 | | 8/2006 |

* cited by examiner

*Primary Examiner* — Thomas D Lee
(74) *Attorney, Agent, or Firm* — Greenblum & Bernstein, P.L.C.

(57) ABSTRACT

A document scanning device includes a pair of light guides that extend in a main scanning direction of a document and illuminate the document, and a reference plate that is positioned closer to the light guides than the document. Each of the light guides has a first area that illuminates the document and a second area that illuminates the reference plate. Each light guide illuminates the reference plate over a wider area between the light guides in the second area than each light guide illuminates the document in the first area. Therefore, the center of the reference plate is illuminated and a sufficient amount of light is reflected on the reference plate.

20 Claims, 7 Drawing Sheets

Fig.7A-1 document reading width

Fig.7A-2 sub-scanning direction

Fig.7B-1 document reading width

Fig.7B-2

DOCUMENT SCANNING DEVICE HAVING LIGHT GUIDE THAT ILLUMINATES DOCUMENT AND REFERENCE PLATE

CROSS-REFERENCE TO RELATED APPLICATIONS

The present application claims priority under 35 U.S.C. §119 of Japanese Application No. 2009-236154, filed on Oct. 13, 2009, the disclosure of which is expressly incorporated by reference herein in its entirety.

BACKGROUND OF THE INVENTION

1. Field of the Invention

The present invention relates to a document scanning device having a pair of light guides that extend in a main scanning direction of a document and illuminate the document, and a reference plate that is positioned closer to the light guides than the document.

2. Description of Related Art

In a document scanning device for scanning an image on a document, a lighting device illuminates the document face, and a reading sensor receives light reflected by the document face and outputs an image signal. Conventionally, such a lighting device generally uses a fluorescent tube as its light source. In recent years, however, LEDs have become common, in view of energy conservation, etc.

A number of LEDs do not necessarily have to be arranged over a reading area of the document. Just one LED can be used with a columnar light guide that extends over the entire reading area and guides light emitted by the LED to the document surface. Such a light guide has prisms to reflect the light emitted by the LED (Related Art 1).

A light amount of the light source fluctuates due to starting characteristics or a change in luminous efficiency caused by ambient temperature. Accordingly, when the light source is turned on or scanning of a document is started, a correction of the output image signal is performed on a basis of the light amount of the light source. In order to determine the light amount, a reference plate (usually a white sheet) is provided outside the document reading area to reflect light emitted by the LED toward the reading sensor (Related Art 2).

Related Art 1: Japanese Patent Application Publication No. 2001-61040
Related Art 2: Japanese Patent Application Publication No. 2006-211526

Figure 7A:
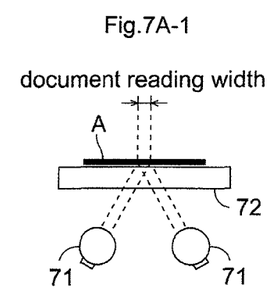

As shown in FIG. 7A-1, a pair of light guides 71 are used to illuminate a document A, and each light guide 71 has narrow prisms to avoid an unnecessary light illumination outside an area of a document reading width along a sub-scanning direction.

Figure 7A:
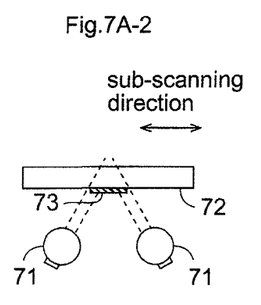

Meanwhile, as shown in FIG. 7A-2, a reference plate 73 is provided inside a document glass 72 to avoid interference with the document A and an adhesion of dust. Therefore, the reference plate 73 is positioned closer to the light guides 71 than the document A.

Accordingly, when the prisms of the light guides 71 are just wide enough to illuminate the document over the reading width, the center of the reference plate 73 is not illuminated at all. Thus, a sufficient amount of light is not reflected on the reference plate 73, and the light amount of (i.e. emitted by) the light source is not accurately determined.

Figure 7B:
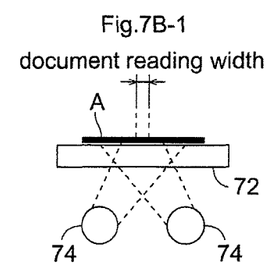
Figure 7B:
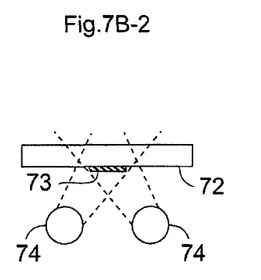

On the other hand, as shown in FIGS. 7B-1 and 7B-2, when fluorescent tubes 74 are used instead of the LEDs and the light guides 71, the document A is illuminated over a wide area along the sub-scanning direction, and the whole reference plate 73 is illuminated.

SUMMARY OF THE INVENTION

In view of the above circumstances, present invention provides a document scanning device in which a sufficient amount of light is reflected on a reference plate even when light guides are used.

An aspect of the present invention provides a document scanning device including a pair of light guides that extend in a main scanning direction of a document and illuminate the document, and a reference plate that is positioned closer to the light guides than the document. Each of the light guides has a first area that illuminates the document and a second area that illuminates the reference plate. Each light guide illuminates the reference plate over a wider area between the light guides in the second area than each light guide illuminates the document in the first area.

According to the aspect of the present invention, since each light guide illuminates the reference plate over a wider area between the light guides in the second area than each light guide illuminates the document in the first area, the center of the reference plate is illuminated. Thus, a sufficient amount of light is reflected on the reference plate.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 7A-1-7B-2 are schematic views, each illustrating a light illuminating state by either a light guide or a fluorescent tube.

DETAILED DESCRIPTION OF THE INVENTION

The particulars shown herein are by way of non-limiting example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the concepts and principles of the present invention may be embodied in practice.

Embodiments of the present invention will be described with reference to the drawings, hereinafter.

Figure 1:
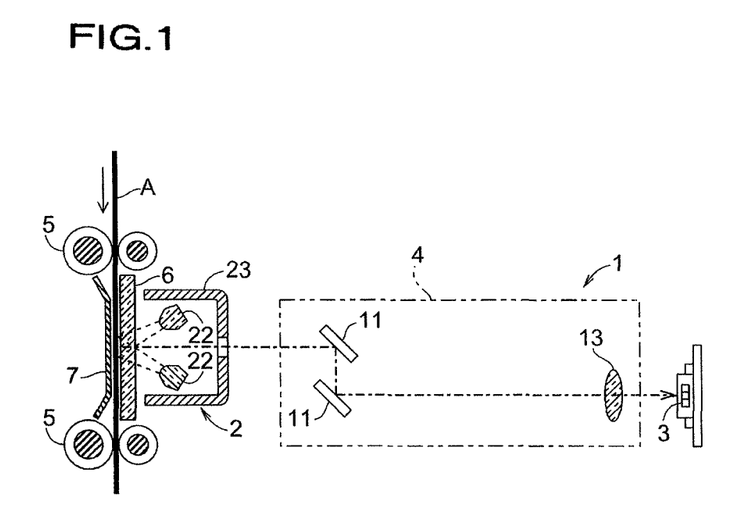
FIG. 1 is a schematic diagram illustrating a document scanning device according to an embodiment of the present invention.

As shown in FIG. 1, the document scanning device 1 according to an embodiment of the present invention includes a lighting device 2 that extends in a main scanning direction to illuminate a document A, a reading sensor 3 that receives reflected light from the document A and outputs an image signal, and a minification optical system 4 that guides the reflected light from the document A to the reading sensor 3.

The reading sensor 3 includes a line sensor in which multiple light-receiving elements (CCD) of each color of RGB are arranged along the main scanning direction. The light-receiving element converts light into an electric signal. The document A is fed between a document glass 6 and a document guide 7 by feed rollers 5. Thus, scanning in a sub-scanning direction is accomplished by the conveyance (or feed) of the document A.

The minification optical system 4 includes multiple mirrors 11 and a lens 13. The lens 13 forms an image on a light-receiving surface of the reading sensor 3 according to the reflected light from the document A, and reduces the size of the image in the main scanning direction to match the width of the reading sensor 3.

Figure 2:
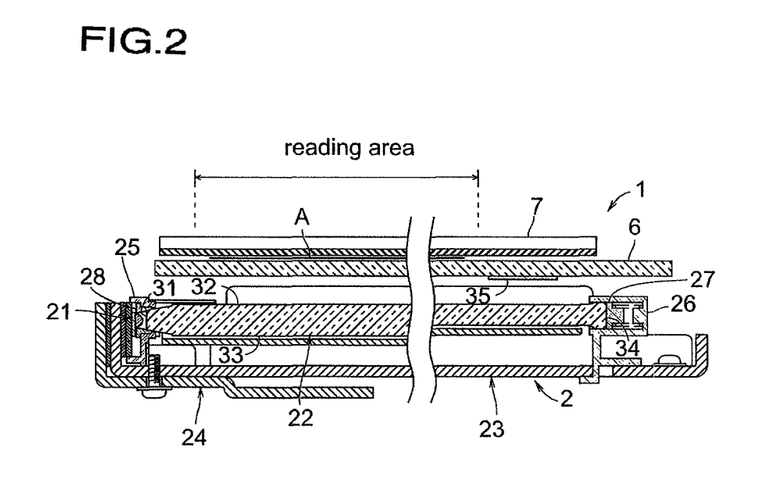
FIG. 2 is a cross-sectional view of a lighting device shown in FIG. 1.

As shown in FIG. 2, the lighting device 2 includes a light source 21, a light guide 22 that guides the light emitted by the light source 21 to a reading surface of the document A, a housing 23 that integrally supports the light source 21 and the light guide 22, and a heat radiator 24 that radiates heat generated by the light source 21.

The light source 21 has an LED chip provided on a ceramic base, and a semispherical lens that covers the LED chip, for example. The light source 21 is a one-chip type white LED. Thus, the LED chip emits blue light and the lens is made of a transparent bonding material, such as a silicon, etc., in which yellow phosphor is disposed. The blue light emitted by the LED chip is converted into yellow light by the yellow phosphor in the lens, and white light is produced by mixing the blue light transmitted through the lens with the yellow light emitted by the yellow phosphor.

The light guide 22 extends substantially across the entire width of the reading area. In order for the light emitted by the light source 21 to be incident on a light incident surface 31 at an end of the light guide 22 in a longitudinal direction thereof and to be output from a light output surface 32 extending in the longitudinal direction, a light reflection portion 33 is provided to face the light output surface 32. The light guide 22 is made of a resin material, such as an acrylic resin (PMMA), etc., which has translucency. The light guide 22 has a tapered shape in which a cross-section area is gradually reduced from the light source side to the other side, opposite to the light source.

The light incident surface 31 is a flat surface, and the light output surface 32 is a curved surface having an elliptical cross-section. In the light reflection portion 33, multiple projection-like prisms, each having a triangular or trapezoidal cross-section, are arranged on the light guide 22 along the longitudinal direction. Each prism extends in a direction perpendicular to the longitudinal direction of the light guide 22.

An end portion of the light guide 22 on the light source side is held by a first holding member 25. The other end portion of the light guide 22 on the side opposite to the light source is held by a second holding member 26. A light reflector 28, which guides the light emitted by the light source 21 to the light incident surface 31 of the light guide 22, is provided at the end portion of the light guide 22 on the light source side. A mirror member 27 is accommodated in the second holding member 26, which holds the end portion of the light guide 22 on the side opposite to the light source. The mirror member 27 is able to contact an end surface 34 of the light guide 22. The mirror member 27 has a reflection surface on the side of the end surface 34 of the light guide 22. The light that reaches the end surface 34 of the light guide 22 after repeatedly being refracted and reflected in the light guide 22, is reflected by the reflection surface of the mirror member 27, and returns to the interior of the light guide 22.

In this embodiment, two light guides 22 are provided in parallel with each other (see FIG. 1). Further, two light sources 21 are provided to respectively correspond to the two light guides 22.

In the light source 21 using an LED, the amount of light changes about 10% according to starting characteristics, and luminous efficiency changes along with a change in ambient temperature. Accordingly, when the light source is turned on or reading of a document starts, a process to correct the amount of light of the light source 21 is performed to produce a constant output signal from a light receiving element of the reading sensor 3. Thus, in order to measure the amount of the light of the light source 21 during the correction of the amount of the light, a reference plate 35 is provided that reflects light emitted by the light output surface 32 of the light guide 22 to direct the reflected light to the reading sensor 3.

The reference plate 35 is made of, for example, a white sheet member, and is provided outside the document reading area, to avoid interfering with a reading of document A. Further, similar to the lighting device 2, the reference plate 35 is provided inside the document glass 6, to avoid interference with the document A conveyed on the document glass 6, and to avoid an adhesion of dust, such as paper dust, etc. In other words, the reference plate 35 is positioned on the opposite side of the document glass 6 from the document A. Therefore, the light guide 22 is positioned closer to the reference plate 35 than to the document A.

Figure 3:
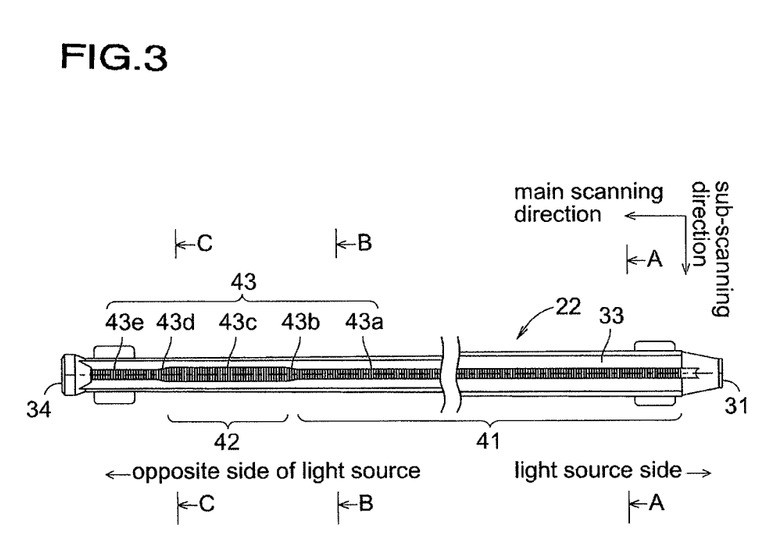
FIG. 3 is a bottom view of a light guide shown in FIG. 2.

As shown in FIG. 3, the light guide 22 has a first area 41 that emits light on the document surface, and a second area 42 that emits light on the reference plate 35. The width of the prism 43 in the second area 42 is greater than the width of the prism 43 positioned in the first area 41. The width of the prism refers to a dimension in a direction perpendicular to the longitudinal direction of the light guide 22.

A prism 43a in the first area 41 continues to a prism 43c in the second area 42. A prism 43b is provided between the prism 43a and prism 43c, such that the width of the prism 43b gradually changes to transition between the widths of the prisms 43a and 43c. Each of the prism 43a and prism 43c has a constant width. Further, in this embodiment, a prism 43e is provided on the side opposite to the light source. A prism 43d is provided between the prism 43e and the prism 43c, such that the width of the prism 43d gradually changes to transition between the widths of the prisms 43c and 43e. These prisms 43 (43a-43e) can be formed simultaneously by using a mold that molds a prism forming surface of the light guide 22. Thus, it is possible to avoid an increase in a manufacturing cost.

Although the light guide 22 is made of a material, such as an acrylic resin, having excellent translucency, light decreases due to light absorption, with increasing distance from the light source 21. Therefore, in order to provide a uniform illuminance distribution of light emitted from the light output surface 32 over the entire area in the longitudinal direction, the reflective area of the prism 43a should be gradually increased from the light source side to the side opposite the light source. Thus, the width of the prism 43a corresponding to the document reading area may be gradually increased from the light source side to the opposite side of the light source.

Figure 4A:
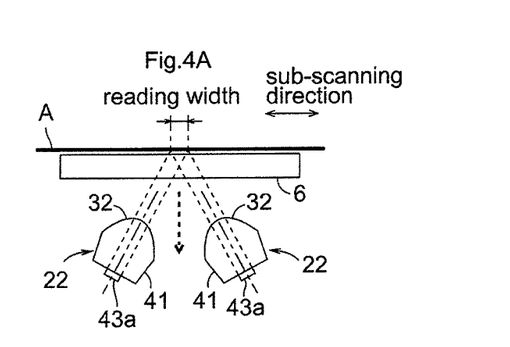
FIGS. 4A-4C are schematic diagrams, each illustrating a light illuminating state by the light guide shown in FIG. 3.
Figure 4B:
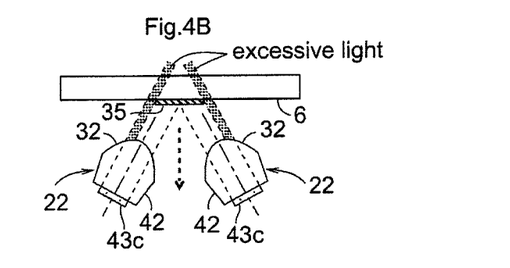
Figure 4C:
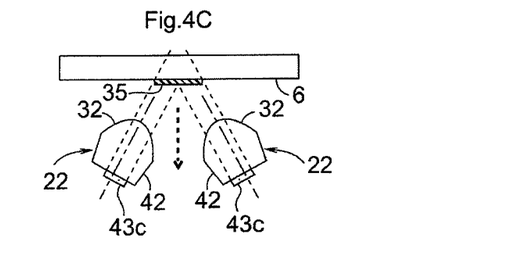

As shown in FIGS. 4A-4C, light emitted from the light output surface 32 of the light guide 22 is incident on the document A or the reference plate 35 in an oblique direction. The reflected light from the document A or the reference plate 35 passes between the two light guides 22 and is incident on the mirror 11 (see FIG. 1).

As shown in FIG. 4A, since the width of the prism 43a is narrow in the first area 41, the light illumination width is narrowed down to the width necessary to illuminate the document reading width. Therefore, since unnecessary light does not illuminate an area outside the document reading width, light use efficiency can be improved. As a result, a reduction in power consumption can be further facilitated.

On the other hand, as shown in FIG. 4B, since the width of the prism 43c is wide in the second area 42, the illumination width in the sub-scanning direction of light is greater than that in the first area 41. Accordingly, the reference plate 35 is illuminated with a sufficient amount of light, and thus, it is possible to control the amount of light stably.

Here, as shown in FIG. 4B, for example, when the prism 43c is formed by equally extending the width of the narrow prism 43a toward opposite directions with respect to the center line of the prism 43a, and when two light guides 22 are arranged in parallel with each other, as shown in FIG. 1, the two light guides 22 having a common configuration can be used side by side. Thus, it is possible to avoid an increase in cost by sharing a component.

Further, as shown in FIG. 4C, when the prism 43c is formed by extending the width of the narrow prism 43a only in one side of the prism 43a with respect to the center line of the prism 43a, and when two light guides 22 are arranged in parallel with each other, as shown in FIG. 1, the widths of the two prisms on the side facing each other are respectively increased. Accordingly, excessive light, which illuminates outside the reference plate 35 (as shown in FIG. 4B), is not generated, and thus the light use efficiency can be further increased.

Figure 5A:
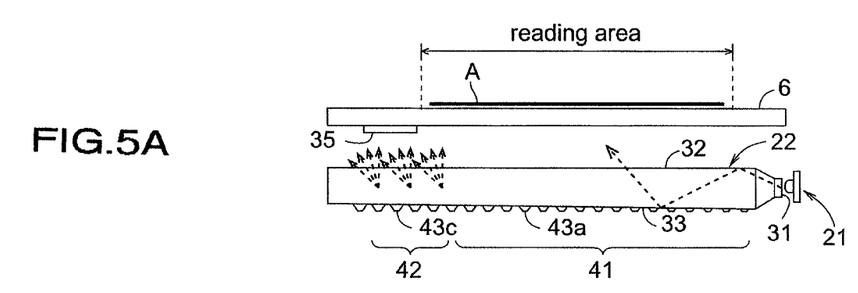
FIGS. 5A and 5B are schematic diagrams illustrating examples in which positions of a second area and a reference plate are changed.

As shown in FIG. 5A, the reference plate 35 is provided on the opposite side of the document reading area from the light source 21. The second area 42 of the light guide 22 is provided at the end portion of the light guide 22 on the side opposite to the light source 21, so as to be located at a position corresponding to the reference plate 35.

Light emitted from the light source 21 and incident on the light incident surface 31 propagates toward the side opposite to the light source in the light guide 22, while being fully reflected by the outer peripheral surface of the light guide 22. The prisms 43a and 43c change the angle of light toward the light output surface 32. At this time, the light output from the light output surface 32 mainly includes an oblique direction component, which is inclined toward the side opposite to the light source with respect to the direction perpendicular to the longitudinal direction of the light guide 22. Accordingly, in order to make the light output from the light output surface after being reflected by the prism 43c in the second area 42 incident on the reference plate 35 effectively, the reference plate 35 may be preferably provided at a position offset from the second area 42 toward the side opposite to the light source.

Figure 5B:
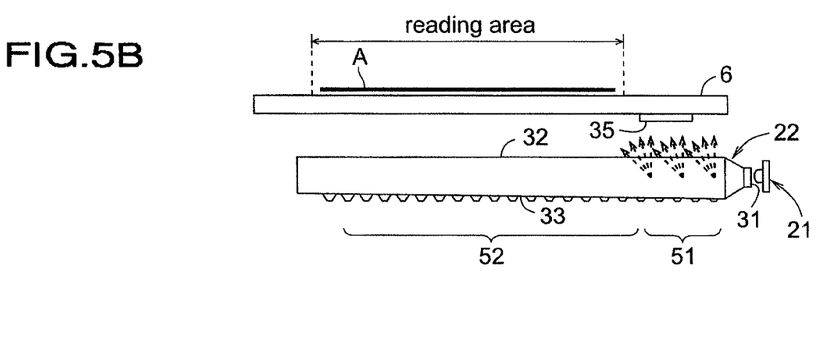

When the second area 51 is provided in the vicinity of the end portion of the light guide 22 at the light source side, as shown in FIG. 5B, in order to make the light emitted from the light output surface 32, which is inclined toward the side opposite to the light source, incident on the reference plate 35 effectively, the reference plate 35 should be positioned spaced from the light source 21. Therefore, an unnecessary empty space is formed on the light source side of the reference plate 35, thereby increasing the dimension of the device in the main scanning direction.

On the other hand, when the second area 42 is provided in the vicinity of the end portion of the light guide 22 on the side opposite to the light source, as shown in FIG. 5A, the reference plate 35 can be positioned close to the reading area, and thus an unnecessary empty area is not formed around the reference plate 35. Accordingly, it is possible to prevent the increase in the dimension of the device in the main scanning direction.

Figure 6A:
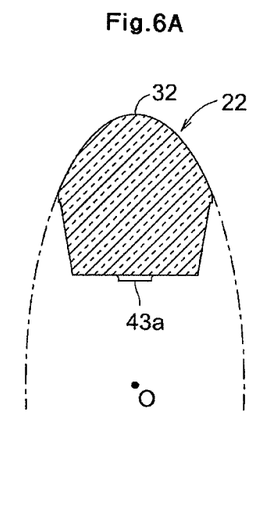
FIGS. 6A-6C are cross-sectional views of the light guide shown in FIG. 3.
Figure 6B:
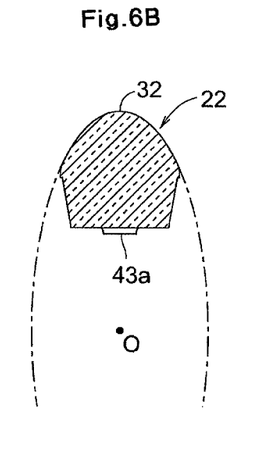
Figure 6C:
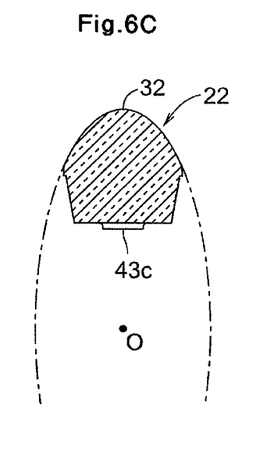

As shown in FIGS. 6A-6C, the light output surface 32 of the light guide 22 has an elliptical cross-section. FIG. 6A is a cross-section taken along the line A-A in FIG. 3, i.e., a cross-sectional shape of an end portion at the light source side. FIG. 6B is a cross-section taken along the line B-B in FIG. 3, i.e., a cross-sectional shape of an end portion in the first area 41 on the side opposite to the light source. FIG. 6C is a cross-section taken along the line C-C in FIG. 3, i.e., a cross-sectional shape of an end portion in the second area 42 on the side opposite to the light source. Thus, the light output surface 32 has homothetic shapes, i.e. elliptic cross-sections having a common ellipticity (e.g., 0.4). Diameter of the ellipse that defines the light output surface 32 gradually decreases from the light source side to the side opposite to the light source.

The light emitted from the light output surface usually decreases due to light attenuation or a decrease in light density toward the end portion of the light guide (on the opposite side of the light source). However, according to the above-described configuration, since the diameter of the ellipse decreases, the light density increases, and thus, the light reflected by the prism in the first area and the prism in the second area increases. Therefore, light can be effectively emitted from the light output surface 32, and a high light intensity with a desired illumination width can be obtained both in the first area and in the second area. In particular, the light output surface 32 can emit light having a high parallelism, by positioning the focal point of the ellipse defining the light output surface 32 in the vicinity of the prism 43.

In the above-described embodiment, scanning in the sub-scanning direction is performed by conveying the document. However, scanning in the sub-scanning direction may be achieved by moving the lighting device and the mirror in the sub-scanning direction with respect to the document placed on the document glass.

Further, in the above-described embodiment, the light reflection portion of the light guide is formed by prisms. However, the light reflection portion according the embodiments of the present invention is not limited thereto. For example, the light reflection portion may be implemented by forming a fine unevenness of the surface, such as by sandblasting, as are non-limiting example.

In a document scanning device according to the feature of the present invention, even when the light illumination width is narrowed down to reduce power consumption in a lighting device using a light guide, the reference plate, which is used for measuring the amount of light of the lighting device, is illuminated with a sufficient amount of light. Thus, the document scanning device according to the features of the present invention is useful as a document scanning device including a lighting device that illuminates a document through a document glass, a reading sensor that receives reflected light from the document and outputs an image signal, and a reference plate that reflects the light emitted from the lighting device to direct the reflected light toward a reading sensor, for measuring an amount of light of the lighting device.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its various aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A document scanning device comprising:
   a pair of light guides that extend in a main scanning direction of a document and illuminate the document; and
   a reference plate that is positioned closer to the light guides than the document;
   wherein each of the light guides has a first area that illuminates the document and a second area that illuminates the reference plate, and
   each light guide illuminates the reference plate over a wider area between the light guides in the second area than each light guide illuminates the document in the first area.

2. The document scanning device according to claim 1, wherein each light guide has a light output surface that outputs light and a light reflection portion facing the light output surface.

3. The document scanning device according to claim 2, wherein the light reflection portion comprises a plurality of prisms arranged in a longitudinal direction of the light guides.

4. The document scanning device according to claim 3, wherein the prisms extend in a direction perpendicular to the longitudinal direction.

5. The document scanning device according to claim 4, wherein each prism has a triangular cross-section.

6. The document scanning device according to claim 4, wherein each prism has a trapezoidal cross-section.

7. The document scanning device according to claim 3, wherein a width, in a direction transverse to a longitudinal direction of the light guides, of the prisms in the second area is greater than a width of the prisms in the first area.

8. The document scanning device according to claim 7, wherein the width of the prisms is uniform substantially throughout each of the first and second areas and gradually changes between the first and second areas.

9. The document scanning device according to claim 3, wherein a reflective area of the prisms increases in accordance with an increase in distance from a light incident surface of each of the light guides.

10. The document scanning device according to claim 3, wherein a width of the prisms in the first area is symmetrical with respect to a centerline of the light guides that extends traverse to a longitudinal direction of the light guides and a width of the prisms in the second area in asymmetrical with respect to the centerline of the light guides.

11. The document scanning device according to claim 2, wherein each light guide has a light incident surface on which light emitted by a light source is incident and an end opposite the light incident surface.

12. The document scanning device according to claim 11, wherein a cross-section of each light guide gradually decreases from the light incident surface to the opposite end.

13. The document scanning device according to claim 11, wherein the second area is closer to the opposite end than the first area.

14. The document scanning device according to claim 11, further comprising a reading sensor that receives light reflected by the document and outputs an image signal.

15. The document scanning device according to claim 14, further comprising a minification optical system that guides the light reflected on the document to the reading sensor.

16. The document scanning device according to claim 2, wherein the light output surface is curved.

17. The document scanning device according to claim 16, wherein the light output surface has an elliptical cross-section.

18. The document scanning device according to claim 17, wherein a diameter of the ellipse that defines the light output surface of each light guide gradually decreases in accordance with an increase in distance from a light incident surface of the light guides.

19. The document scanning device according to claim 17, wherein a focal point of the ellipse that defines the light output surface of each light guide is located in a vicinity of the light reflection portion.

20. The document scanning device according to claim 17, wherein the elliptical cross-section of the light output surface has a common ellipticity along a longitudinal direction of the light guides.

* * * * *